United States Patent [19]

Bernard

[11] Patent Number: 4,788,110
[45] Date of Patent: Nov. 29, 1988

[54] FUEL CELL WITH PARTIALLY SHIELDED INTERNAL REFORMER

[75] Inventor: Randolph Bernard, New Preston, Conn.

[73] Assignee: Energy Research Corporation, Danbury, Conn.

[21] Appl. No.: 110,942

[22] Filed: Oct. 20, 1987

[51] Int. Cl.⁴ ............................................. H01M 8/06
[52] U.S. Cl. ........................................ 429/19; 429/39
[58] Field of Search .................. 429/17, 19, 26, 34, 429/38, 39

[56] References Cited

U.S. PATENT DOCUMENTS

| 3,432,357 | 3/1969 | Dankese | 136/86 |
| 4,365,007 | 12/1982 | Maru et al. | 429/17 |
| 4,548,876 | 10/1985 | Bregoli | 429/39 |
| 4,567,117 | 1/1986 | Patel et al. | 429/19 |
| 4,618,543 | 10/1986 | Matsumura et al. | 429/19 |
| 4,647,516 | 3/1987 | Matsumura et al. | 429/17 |

Primary Examiner—Donald L. Walton
Attorney, Agent, or Firm—Robin, Blecker & Daley

[57] ABSTRACT

A fuel cell system including a gas-diffusion electrode and a first passage means having at least one first section including a reforming catalyst and isolated in relation to the gas-diffusion electrode and at least one second section communicative in relation to the gas-diffusion electrode.

22 Claims, 3 Drawing Sheets

FUEL CELL WITH PARTIALLY SHIELDED INTERNAL REFORMER

BACKGROUND OF THE INVENTION

This invention pertains to fuel cells and, in particular, to fuel cells in which there is internal reforming of the hydrocarbon content of the fuel cell supply gas.

It is known in the design of fuel cells, such as, for example, molten carbonate and phosphoric acid cells, to internally reform the hydrocarbon content of the fuel supply gas. Such hydrocarbon content usually contains methane which itself is relatively electrochemically inactive, but which when reformed produces hydrogen and carbon monoxide which are significantly more electrochemically active and, therefore, can readily participate in the fuel cell reaction. Reforming internal of the fuel cell is beneficial in that the reforming reaction is endothermic and serves to offset heat generated in the cell during operation. Accordingly, by internal reforming, the load on the fuel cell cooling system can be reduced.

U.S. Pat. No. 3,488,226 discloses an internal reforming scheme in which the reforming catalyst is situated within the anode electrode gas chamber. The hydrocarbon content of the supply fuel gas is thus substantially all reformed during its passage through the anode chamber, and, moreover, is immediately available to the cell anode upon reformation. A drawback of this arrangement, however, is that the endothermic nature of the reforming reaction results in cold spots in the anode chamber which cause condensation of electrolyte vapor transmitted to the anode chamber through the gas-diffusion anode electrode. Such condensation, in turn, may severely reduce catalytic activity and, as a result, the reforming reaction. A second drawback of this arrangement is that because the electrolyte is a liquid at operating temperature a film of electrolyte will creep over the anode chamber surfaces and contaminate the catalyst. Such film creepage, in turn, may severely reduce the catalytic activity and, as a result, the reforming reaction.

U.S. Pat. No. 4,182,895, assigned to the same assignee hereof, attempts to avoid electrolyte vapor condensation and electrolyte film creepage by providing an electrolyte-isolated chamber in which the catalyst is placed and in which the reforming reaction takes place. Fuel supply gas reformed in the electrolyte-isolated chamber is then introduced into the anode (electrolyte-communicative) chamber for electrochemical reaction. Owing to the isolation of the reforming chamber from the electrolyte, electrolyte vapor condensation and electrolyte film creepage on the reforming catalyst does not occur and catalyst activity is preserved.

In the '795 patent arrangement, however, reformed gas is not immediately available to the anode chamber, but must be introduced into such chamber subsequent to reformation. Furthermore, since the product gas containing water ($H_2O$) is not available to the electrolyte isolated channel, reformation is not driven to completion, i.e., reformation is limited to thermodynamic equilibrum which is about 80% of total conversion.

U.S. Pat. No. 4,365,007, also assigned to the same assignee hereof, discloses a fuel cell internal reforming arrangement which is designed to provide immediate availability of reformed gas without deactivation of the reforming catalyst by the electrolyte. In this arrangement, a gas porous member is used to define first and second fuel cell passages. The first passage is in communication with the fuel cell anode electrode and with the second passage which includes the reforming catalyst. The arrangement is further provided with a differential pressure means which causes flow of gas reformed in the second passage to the first passage and retards electrolyte vapor from flowing from the first passage to the second passage. As a result, poisoning of the reforming catalyst by vapor condensation is prevented.

The gas porous member in the '007 patent system is in the form of a corrugated plate having perforations over its entire surface and along the length of the first and second passages. This patent also states that increased uniformity of the gas flow distribution can be realized by using an increased number of performations at the gas exit relative to the gas entrance end. While this arrangement thus provides immediate availability of the reformed gas as well as catalyst protection, it also requires a differential pressure means to be utilized. Also, like the arrangement of the '895 patent, reformation is not driven to completion because of the unavailability of the product gases of the electrochemical reaction to the second passage.

It is an object of the present invention to provide a fuel cell having improved internal reforming.

It is a further object of the present invention to provide a simplified fuel cell arrangement in which internal reforming is carried out such that the reformed gas is made substantially immediately available to the cell electrode, while at the same time avoiding electrolyte contamination by vapor condensation and film creepage on the reforming catalyst and enabling reformation to go to substantial completion.

SUMMARY OF THE INVENTION

In accordance with the principles of the present invention, the above and other objectives are realized in a fuel cell system wherein a first passage means is provided in adjacent relationship to a fuel cell gas-diffusion electrode. The first passage means has at least one first section for which the direct passage of products between itself and the gas diffusion electrode is substantially inhibited (hereinafter referred to as an "isolated section") and at least one second section for which such direct passage of products is allowed (hereinafter referred to as a "communicative section"). A catalyst for reforming hydrocarbons is disposed in at least one of the isolated sections of the first passage.

Fuel supplied to this isolated section is thereby reformed when passing through the section and the reformed fuel made immediately available to the gas-diffusion electrode when it passes through the succeeding one or more communicative sections. Moreover, the catalyst in the isolated section is protected against contamination by electrolyte vapor condensation and film creepage, while it is able to promote complete conversion due to flow thereto of electrochemical reaction products from adjacent communicative sections.

In the embodiment of the invention to be disclosed hereinafter, the first passage means is formed, in part, by a corrugated plate having crest regions abutting the gas-diffusion electrode and valley regions spaced from this electrode. The plate is solid over its surface defining the first sections of the first passage means, thereby realizing the isolated character of these sections. Further, in this embodiment, an isolated section housing a catalyst is disposed at the gas entry end of the first passage.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
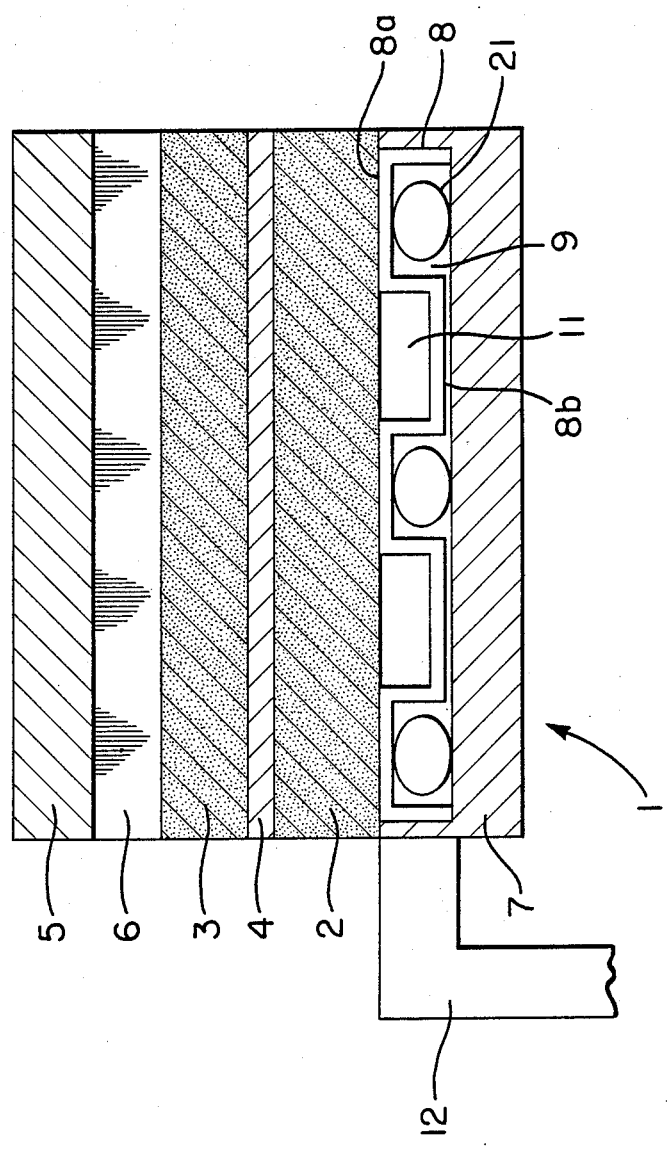
FIG. 1 shows schematically a fuel cell system in accordance with the principles of the present invention.

In FIG. 1, a fuel cell 1 comprises anode and cathode electrodes 2 and 3, of gas diffusion type, having an electrolyte 4, therebetween. A separator plate 5 defines a chamber 6 for receiving cathode supply gas and delivering same to the cathode electrode 3. A further plate, shown as bipolar plate 7, in cooperation with crest regions 8a of a corrugated member 8 defines chambers or channels 9 for receiving anode supply gas having hydrogen and hydrocarbon content. These channels are spaced one from the other by channels 11 defined by the valley regions 8b of the member 8 and the anode electrode 2. The channels 11 likewise receive anode supply gas which is delivered to the channels 11 and the channels 9 by a common manifold 12.

As shown, the channels 9 and 11 are of substantially equal proportion or dimension. However, it should be appreciated that these characteristics of the channels can be varied so as to direct the flow of the supply gas to one or the other of the channels to achieve desired performance and rating.

Figure 2:
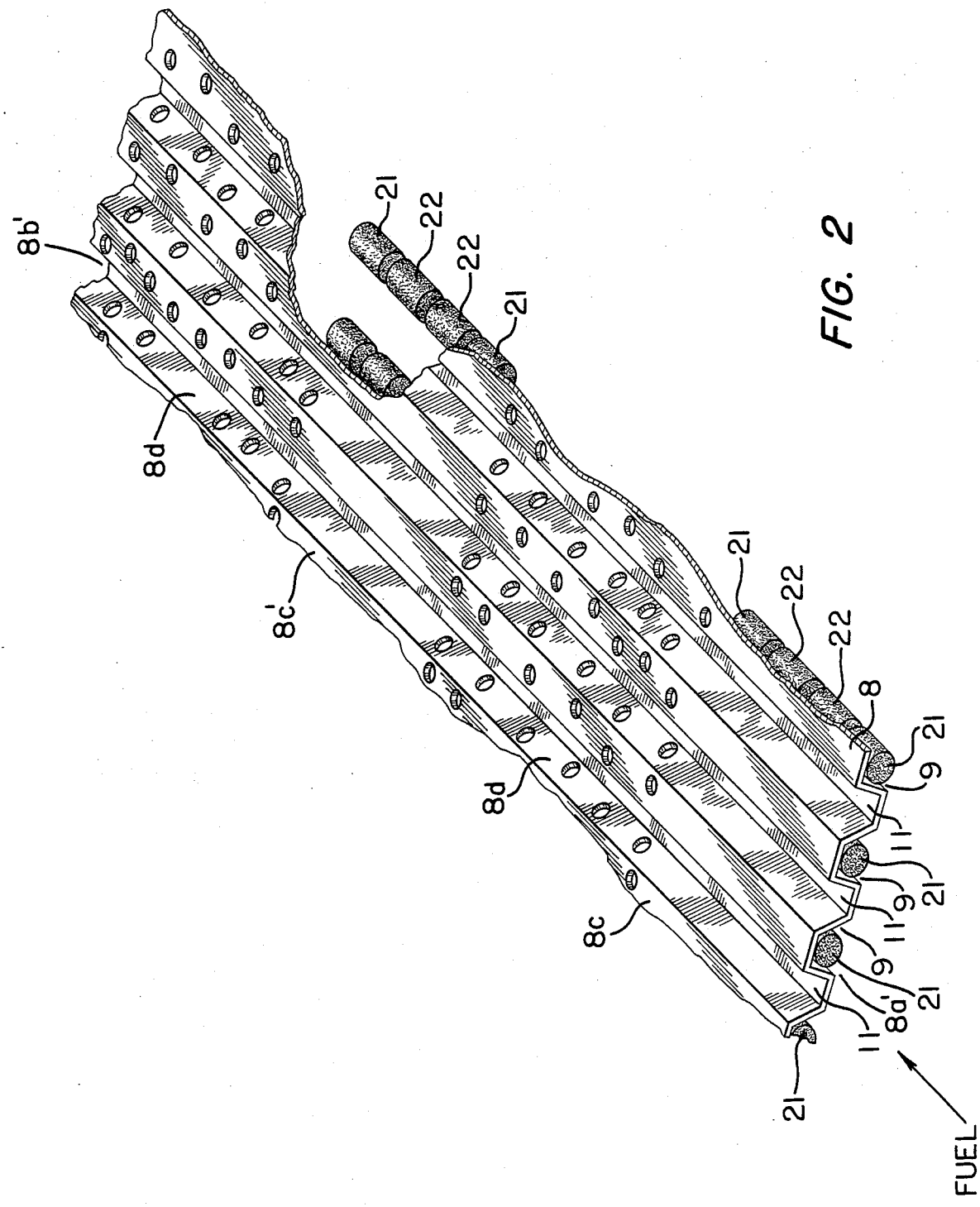
FIG. 2 shows an isometric view of a plate member and adjacent catalyst of the fuel cell system of FIG. 1.

FIG. 2 shows an illustrative embodiment of the member 8 in accordance with the principles of the present invention. In this embodiment, the member 8 is a thin plate having a solid surface portion 8c extending from the gas entry port 8a' of the member. The solid portion 8c defines a first isolated section of the channels 9.

Catalyst 22 and electrolyte sinks 21 are located in this section of the channels 9 and the isolated nature of the section protects the catalyst 22 from direct passage (i.e., shortest path passage) of products, including electrolyte, from electrolyte containing anode 2. In particular, electrolyte vapor cannot condense on the catalyst 22, since the solid nature of the section 8c prevents the vapor from reaching the catalyst. Furthermore, electrolyte film which tends to creep over the surface of the member 8 cannot now readily reach the catalyst 22 because the path which the film must travel has been greatly extended.

This is more easily understood by recognizing that the vertical separation between the electrolyte 4 and the reforming catalyst 22 is small and falls between hundreds and thousands of an inch (0.01" to 0.001"), while the horizontal distance between gas entry port 8a' and gas exit port 8b' of the plate 8 is large and typically falls between two and four feet (2'×4'). Accordingly, by requiring the electrolyte film to travel horizontally to reach catalyst 22 the path of travel for the electrolyte film is increased by 50 to 1000 times, depending upon the length of the isolation section 8c.

The catalyst 22 is further protected from electrolyte film creepage, since before reaching the catalyst 22 the film must first pass over the catalyst sinks 21 situated adjacent to the ends of the section 8c. Electrolyte film which encounters the sinks 21 will be absorbed by capillary forces and further inhibited from contaminating the catalyst 22.

In the illustrative case of FIG. 2, the electrolyte sinks 21 are also comprised of a catalyst material. However, it is within the contemplation of the invention to utilize electrolyte sinks made from material other than catalyst. Thus, for example, a porous body of sintered metal or metal oxide powders could be utilized at this location to absorb the electrolyte film and protect the catalyst 22 from deactivation.

Abutting the plate portion 8c and extending towards the gas exit end 8b' of the member 8 is a perforated surface portion 8d. The perforated surface portion defines a communicative section and allows reformed gas from the channels 9 to pass to the channels 11 and, therefore, to anode electrode 2 for electrochemical conversion.

Figure 3:
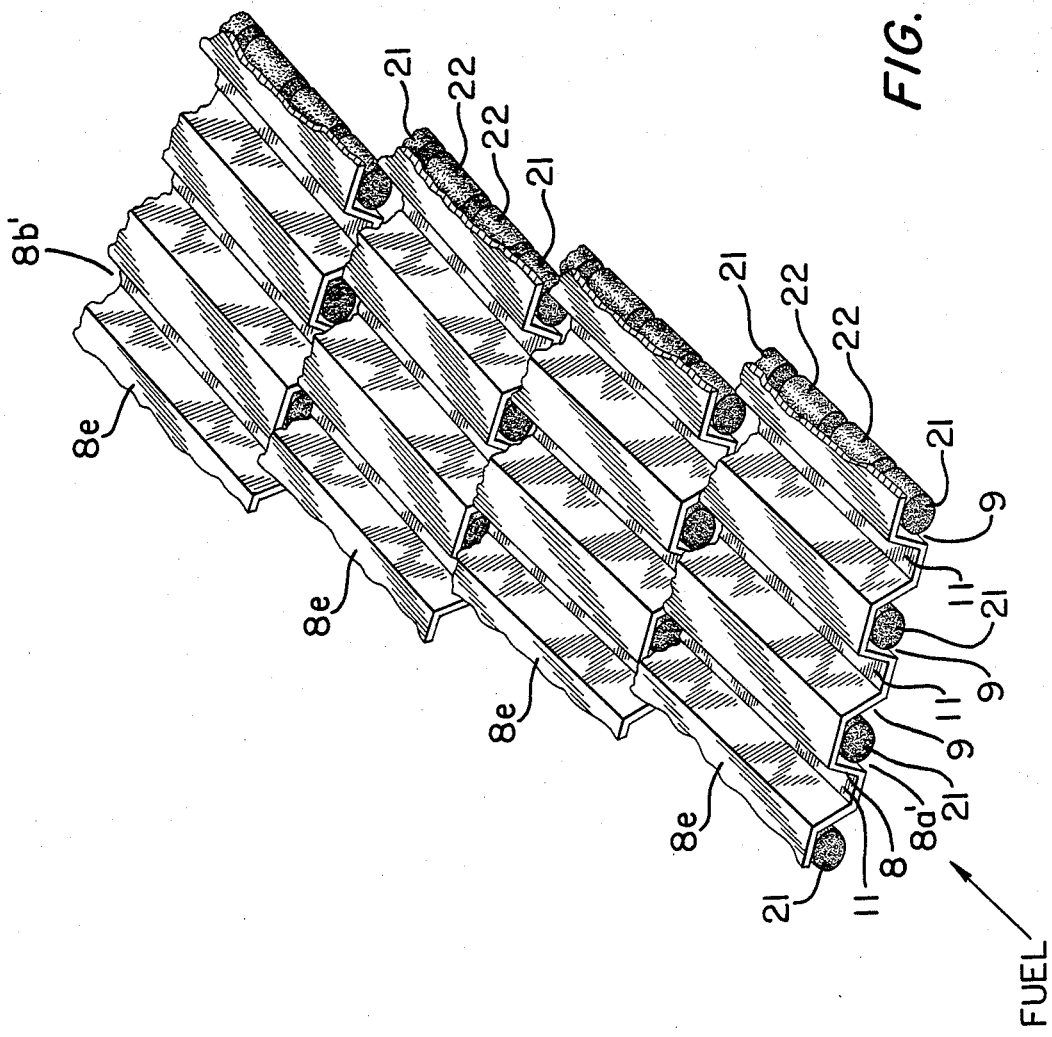
FIG. 3 illustrates an isometric view of a second embodiment of a plate member and adjacent catalyst of the fuel cell system of FIG. 1.

As can be appreciated, while the communicative section has been achieved in the FIG. 2 embodiment through perforated surface portion 8d of the plate 8, other plate arrangements for realizing such a section can also be utilized. One such alternate arrangement is depicted in FIG. 3 wherein the perforated plate portion 8d has been replaced by a plate valley region. In the particular case of FIG. 3, this is accomplished by segmenting plate 8 along its length into a plurality of independent plates 8e and staggering successive plates so that the valley and crest regions of each successive plate align with the crest and valley regions of the previous plate. As a result, a crest region (isolated section) protecting catalyst 22 is followed by a valley region (communicative section) which allows communication with the anode electrode 2. The modified member 8 of FIG. 3 thus protects the catalyst 22 from electrolyte contamination while allowing communication of the reformed gas with the anode electrode 2.

Returning now to FIG. 2, following the perforated surface portion 8d is another solid surface portion 8c'. The solid portion 8c' defines a second and subsequent isolated section of the channels 9 and catalyst 22 and electrolyte sinks 21 are also located in this section.

Catalyst 22 in the section 8c' is protected from electrolyte film contamination in the same manner as described above for the section 8c i.e., by an extended path length for the film and by use of electrolyte sinks 21. The catalyst 22 is also protected from electrolyte vapor condensation because vapor from the direct path (i.e., vertically downward from the anode 2) is blocked by the solid nature of the section 8c' and because vapor from the indirect path (i.e., from the section 8d) is not able to readily condense. The latter can be understood by understanding the nature of the fuel cell 1. Thus, in the fuel cell 1, the temperature increases from the gas entry end 8a' the gas exit end 8b of the member 8 due to the exothermic nature of the cell reaction. The electrolyte vapor from a preceding and, therefore, a cooler section of the cell, i.e., section 8d, are thus at a lower temperature than the temperature of the succeeding section, i.e., the section 8c'. As a result, condensation of such vapor will not occur in the succeeding section.

Following the isolated section 8c' of the plate 8 is a further communicative section 8d which ends at the exit port 8b'. The section 8d functions similarly to the section 8d following the isolated section 8c.

In order for proper operation of the fuel cell 1 with the member 8, sufficient hydrogen must be present in the gas introduced into the channels 9 and 11 such that electrochemical reaction occurs in the area of the cell along the isolated sections of the channels 9. In accord with the invention, the hydrogen content of the introduced gas is maintained at a level of approximately 3% or greater to realize such electrochemical reaction.

In all cases it is understood that the above-described arrangements are merely illustrative of the many possible specific embodiments which represent applications of the present invention. Numerous and varied other arrangements can readily be devised in accordance with the principles of the invention without departing from the spirit and scope of the invention.

What is claimed is:

1. An electrochemical cell system comprising:
   a gas diffusion electrode;
   a first passage means having a gas entry and gas exits ends and at least one first section and at least one second section therebetween, each said first section being an isolated section in relation to said electrode and each said second section being a communicative section in relation to said electrode;
   a catalyst for reforming hydrocarbons situated in at least a first one of said first sections, said first one of said first sections being closer to said gas entry end of said first passage means then a first one of said second sections.

2. An electrochemical cell in accordance with claim 1 wherein:
   said first one of said first sections is at the gas entry end of said first passage means and said first one of said second sections immediately follows said first one of said first sections.

3. An electrochemical cell system in accordance with claim 1 wherein:
   said first one of said second sections is devoid of catalyst.

4. An electrochemical cell system in accordance with claim 1 wherein:
   catalyst is disposed in each of said first sections.

5. An electrochemical cell system comprising:
   a gas diffusion electrode;
   a first passage means having gas entry and gas exits ends and at least one first section and at least one second section therebetween, each said first section being an isolated section in relation to said electrode and each said second section being a communicative section in relation to said electrode;
   a catalyst for reforming hydrocarbons situated in at least a first one of said first sections; and
   an electrolyte sink situated at an end of said first one of said first sections.

6. An electrochemical cell system in accordance with claim 5 wherein:
   said electrolyte sink comprises one of a catalyst material and a porous body of sintered metal or metal oxide.

7. An electrochemical cell system in accordance with claim 5 further comprising:
   an electrolyte sink situated at the other end of said first one of said first sections.

8. An electrochemical cell system comprising:
   a gas diffusion electrode;
   a first passage means having gas entry and gas exits ends and at least one first section and at least one second section therebetween, each said first section being an isolated section in relation to said electrode and each said second section being a communicative section in relation to said electrode;
   a catalyst for reforming hydrocarbons situated at least a first one of said first sections;
   a second passage means having gas entry and gas exit ends and being in gas-communication with said gas-diffusion electrode;
   each said first section of said first passage means being an isolated section in relation to said second passage means and each said second section of said first passage means being a communicative section in relation to said second passage means.

9. An electrochemical cell system in accordance with claim 8 further comprising:
   a number of further first passages means;
   a number of further second passages means;
   said first and second passage means being situated in adjacent alternating relationship.

10. An electrochemical cell system in accordance with claim 9 wherein:
    a first plate is situated adjacent said electrode having crest regions abutting said electrode forming said first passage means and valley regions spaced from said electrode forming said second passage means, said crest regions having solid surface portions defining said first sections and perforated surface portions defining said second sections.

11. An electrochemical cell system in accordance with claim 10 further comprising:
    a second plate adjacent to said first plate and in abutting relationship with the valley regions of said first plate;
    an electrolyte abutting the surface of said electrode opposite the surface abutting said crest regions of said first plate;
    a further gas-diffusion electrode abutting the surface of said electrolyte opposite the surface abutting said gas-diffusion electrode;
    a third plate abutting said further electrode and having passsages for supplying gas to said further electrode.

12. An electrochemical cell system in accordance with claim 8 further comprising:
    a manifold common to said gas entry ports of said first and second passage means for supplying gas with hydrocarbon content to said first and second passage means.

13. An electrochemical cell system in accordance with claim 12 further comprising:
    means for supplying gas to said common manifold, said gas having a hydrogen content of at least three percent (3%).

14. An electrochemical cell system comprising:
    a gas diffusion electrode;
    a first passage means having gas entry and gas exits ends and at least one first section and at least one second section therebetween, each said first section being an isolated section in relation to said electrode and each said second section being a communicative section in relation to said electrode;
    a catalyst for reforming hydrocarbons situated in at least a first one of said first sections; and a number of further first passage means, said first passage means being situated in adjacent relationship.

15. A electrochemical cell in accordance with claim 14 wherein:
   a plurality of plates are situated adjacent said electrode, said plates having crest regions abutting said electrode and valley regions spaced from said electrode and being situated one after the other along the length of said electrode, the crest and valley regions of each plate aligning with the respective valley and crest regions of the preceding plate, the crest regions of the plates forming the first sections of the first passage means and the valley regions of the plates forming the second sections of the first passage means.

16. An electrochemical cell system in accordance with claim 15 further comprising:
   a second plate adjacent to said plurality of plates and in abutting relationship with the valley regions of said plurality of plates;
   an electrolyte abutting the surface of said electrode opposite the surface abutting said crest regions of said pluarality of plates;
   a further gas-diffusion electrode abutting the surface of said electrolyte opposite the surface abutting said gas-diffusion electrode;
   a third plate abutting said further electrode and having passsages for supplying gas to said further electrode.

17. An electrochemical cell system in accordance with claim 14 further comprising:
   a manifold common to said gas entry ports of said first passage means for supplying gas with hydrocarbon content to said first passage means.

18. An electrochemical cell system in accordance with claim 17 further comprising:
   means for supplying gas to said common manifold, said gas having a hydrogen content of at least three percent (3%).

19. An electrochemical cell system comprising:
   a gas diffusion electrode;
   means adapted to receive an electrolyte so the electrolyte is in comnunication with the gas diffusion electrode, the electrolyte forming a film which creeps through the cell;
   a catalyst disposed in the cell for reforming fuel to produce fuel gas for the cell, there being a path for said electrolyte film to creep to said catalyst;
   and means in said path for increasing the length of said path.

20. An electrochemical cell system comprising:
   a gas diffusion electrode;
   means adapted to receive an electrolyte so the electrolyte is in comnunication with the gas diffusion electrode, the electrolyte forming a film which creeps through the cell;
   a catalyst disposed in the cell for reforming fuel to produce fuel gas for the cell, there being a path for said electrolyte film to creep to said catalyst;
   and electrolyte sink means in said path for inhibiting said film from reaching said catalyst.

21. An electrochemical cell system in accordance with claim 20 wherein:
   said electrolyte sink means comprises a catalyst material.

22. An electrochemical cell system in accordance with claim 20 wherein:
   said catalyst sink comprises a porous body of sintered metal or metal oxide.

* * * * *